United States Patent
Harrison et al.

(10) Patent No.: US 7,967,270 B2
(45) Date of Patent: Jun. 28, 2011

(54) EYEGLASS HOLDER

(76) Inventors: Howard Jason Harrison, Bethesda, MD (US); Dana Alison Harrison, Bethesda, MD (US)

(*) Notice: Subject to any disclaimer, the term of this patent is extended or adjusted under 35 U.S.C. 154(b) by 2090 days.

(21) Appl. No.: 10/774,616

(22) Filed: Feb. 10, 2004

(65) Prior Publication Data
US 2005/0173602 A1 Aug. 11, 2005

(51) Int. Cl.
*A47F 5/00* (2006.01)
*A44B 6/00* (2006.01)

(52) U.S. Cl. .......... 248/309.1; 24/3.1; 24/3.3; 211/85.1; 248/902

(58) Field of Classification Search .............. 248/309.1, 248/310, 316.7, 231.81, 902, 915; 211/85.1, 211/85.7; 24/3.1, 3.3, 3.8
See application file for complete search history.

(56) References Cited

U.S. PATENT DOCUMENTS

| | | | |
|---|---|---|---|
| 3,325,939 A * | 6/1967 | Ryan et al. | 446/374 |
| 4,062,144 A * | 12/1977 | Holden et al. | 446/371 |
| 4,710,145 A | 12/1987 | Hall Vandis | |
| 5,000,410 A * | 3/1991 | Beavers | 248/205.3 |
| 5,069,416 A | 12/1991 | Ennis | |
| 5,188,322 A | 2/1993 | Kinstrey | |
| 5,538,166 A | 7/1996 | Ogawa et al. | |
| 5,568,872 A * | 10/1996 | Hinnant, Sr. | 211/85.1 |
| 5,921,409 A * | 7/1999 | Gerber et al. | 211/85.1 |
| D417,566 S | 12/1999 | Baldwin et al. | |
| 6,102,346 A | 8/2000 | Visser | |
| 6,106,360 A | 8/2000 | Jenkins et al. | |
| 6,309,016 B1 * | 10/2001 | Aloisi | 297/181 |
| 6,401,371 B2 | 6/2002 | Martorella | |
| 6,471,166 B1 | 10/2002 | Toettcher | |
| 2001/0034013 A1 | 10/2001 | Bennett | |
| 2002/0045401 A1 | 4/2002 | Enku | |
| 2003/0140938 A1 | 7/2003 | Evans et al. | |

OTHER PUBLICATIONS

Webpage for EZ Pose Flexible Doll Bodies (www.ezpose.com), Apr. 20, 1999.

* cited by examiner

*Primary Examiner* — Tan Le
(74) *Attorney, Agent, or Firm* — Karin Hessler

(57) ABSTRACT

The invention comprises an eyeglass holder. In one embodiment, the eyeglass holder comprises a toy or doll figure to encourage children to wear and take care of eyeglasses.

6 Claims, 5 Drawing Sheets

EYEGLASS HOLDER

FIELD OF THE INVENTION

The invention relates to an eyeglass holder or stand that is convenient and, in one embodiment, has an appearance for encouraging or enticing the use and care of eyeglasses, including particularly the use by children.

BACKGROUND OF THE INVENTION

Devices and designs for an apparatus to store and protect eyeglasses when not in use typically take solely a utilitarian form. For example, the design of U.S. D417,566 consists of a wire frame that combines a penholder with an eyeglass holder. Similarly, the device of U.S. Pat. No. 5,979,849 combines a cleaning station with an eyeglass holder. Especially in the case of children, these devices and designs are lacking in their ability to encourage one to care for, remember the placement of, and wear the eyeglasses. Adults will also find a decorative eyeglass holder that can be placed in a convenient location useful. Thus, there is a need for an improved eyeglass holder.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms depicted in the drawings, described in this Summary of the Invention, or described in the Detailed Description. One skilled in the art can recognize that there are numerous modifications, equivalents, and alternative constructions that fall within the spirit and scope of the invention.

In one embodiment, the eyeglass holder permits a person's or child's favorite figure, animal, or character to be used as an eyeglass storage device. The use of the device entices one to use a single location so that it is easy to locate the eyeglasses. In the case of children, the use of a figure, animal, bank, toy, or character that also holds eyeglasses entices the child to care for and wear the eyeglasses.

In accordance with one aspect of the invention, the eyeglass holder may be shaped like a person, doll, character, or animal, and be made of a variety of components including plastics, rubbers, plush fabric material, or other material, such as material commonly found in a stuffed animal or moveable or posable doll. The person, doll, character or animal can be configured so that it's arms, legs, or appendages can be stably fixed in a horizontal position that can accommodate at least a pair of eyeglasses. The eyeglass holder may also include a plate or base on which the doll, person, character or animal can rest and be firmly planted to avoid falling and damaging the eyeglasses.

In another embodiment, the eyeglass holder is preferably manufactured of plastic and molded to any shape resembling a popular cartoon character, character head, or graphic in a flat or three-dimensional form. While manufacturing the product of plastic materials may be most cost-effective, the eyeglass holder can also be manufactured of wood, metals, ceramic, polymer based materials, silicone, fiberglass, other appropriate materials, or be composed of a combination of these or other appropriate materials.

In general, the figure, person, doll, character, or animal that comprises the form of the holder can be fixed or is fixed so that element(s) extend horizontally to receive or hold the eyeglasses. Typically and in a preferred embodiment, these elements are appendages or arms of a figure, doll, person, character, or animal, for example. The arms, for example, are either permanently fixed in an outward or horizontal configuration, or can be moved from some other configuration to be temporarily fixed in an outward or horizontal configuration. Mechanisms to temporarily fix the element(s), arm(s), or appendage(s) can be devised from those known in the art, including releasable locking gears, moldable plastic, notched rotating hinges or connections, notched ball and socket hinges or connections, flexible doll bodies and/or wire substructures, and other moveable or rotating connections.

In a general aspect, it should be noted that commercially available eyeglasses have different sizes and shapes. The eyeglass holder can be designed to accept a particular commercial design or it may be designed to accept more than one commercially available design. In general, however, the eyeglasses can be folded so that the part of the frame that extends to the ear if folded down against the part of the frame holding the lenses. In the preferred embodiment, the eyeglass holder is designed to accommodate eyeglasses in this folded state. In this embodiment, an integral part of the eyeglass holder can be a notch or element to receive or hold the part of the frame holding the lenses and/or the part of the frame that extends to the ear when the eyeglasses are folded. This notch or element is fashioned so that the frame fits in. The part of the eyeglass frame called the bridge and/or the part that extends to the ear is then leaning back toward the eyeglass holder and fits into a shaped element. The optional use of the combination of a notch or receiving element and a shaped element together securely holds the folded eyeglasses in the eyeglass holder of the invention. The design of the eyeglass holder can thus be modified to better accommodate a particular size or style of eyeglass.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

In FIGS. 1-3 and 5-6, the eyeglasses (1), arms or appendages (2), and body or torso (5) are shown.

FIG. 2 is an alternative human or human-character figure and base structure (3). The face of the figure can also contain eyeglasses (not shown).

FIG. 3 is a schematic showing the positioning of arm or appendages (2) in a manner that can accommodate eyeglasses (1). Arms or appendages (2) that are straight and horizontal to the ground along their length or substantially along their length can also be designed and used.

FIG. 5 shows a frame that can be used to configure an animal-type doll or figure where arms or appendages (2) can be held in a position to accommodate the eyeglasses (1).

FIG. 6 shows a fanciful animal-type figure and base (5) with appendages (2) extended to hold eyeglasses (1).

DETAILED DESCRIPTION

Figure 1:
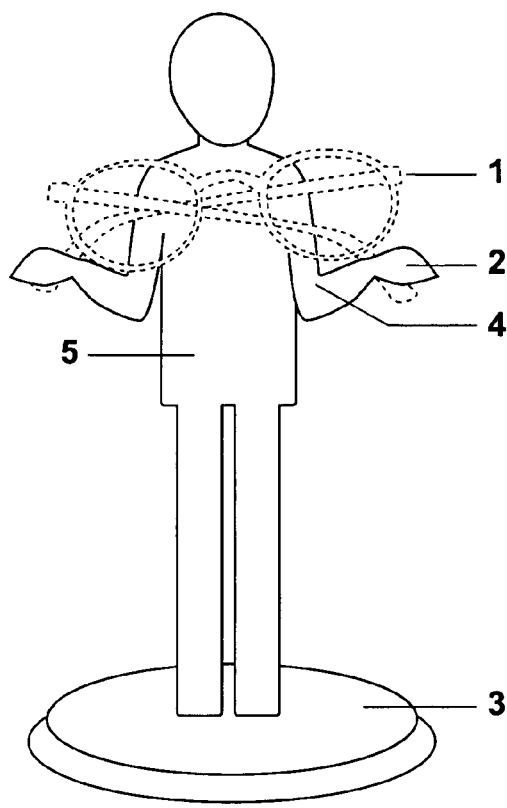
FIG. 1 is an illustration of a human or human-character figure and base structure incorporating the eyeglass holder of the invention, wherein the arms (2) of the doll, character, or figure are fixed in a horizontal position to accommodate the eyeglasses (1). In this view, the arms are in a bent configuration to securely hold the eyeglasses (1). The bend in the arms (4) thus forms an element to receive or hold the eyeglasses LB. In additional embodiments, the bridge and/or folded part of the frame rests against an element of the arms and/or the body (5) of the figure. The design can be modified so that a clip element (not shown) attaches to the part of the folded eyeglass frame that extends towards the ears when worn, and/or so that a convex element extends from the body of the figure to engage the bridge or other part of the frame. In either or both cases, the eyeglasses are securely held against the arms, the bend in the arms, and/or the element(s) on the body of the figure. Of course, the stand (3) and body shape can be altered from that shown in FIG. 1.
Figure 2:
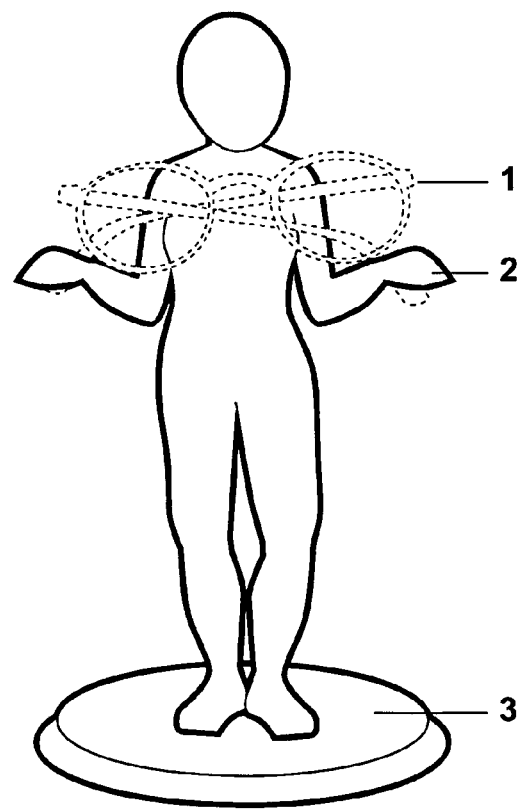
Figure 3:
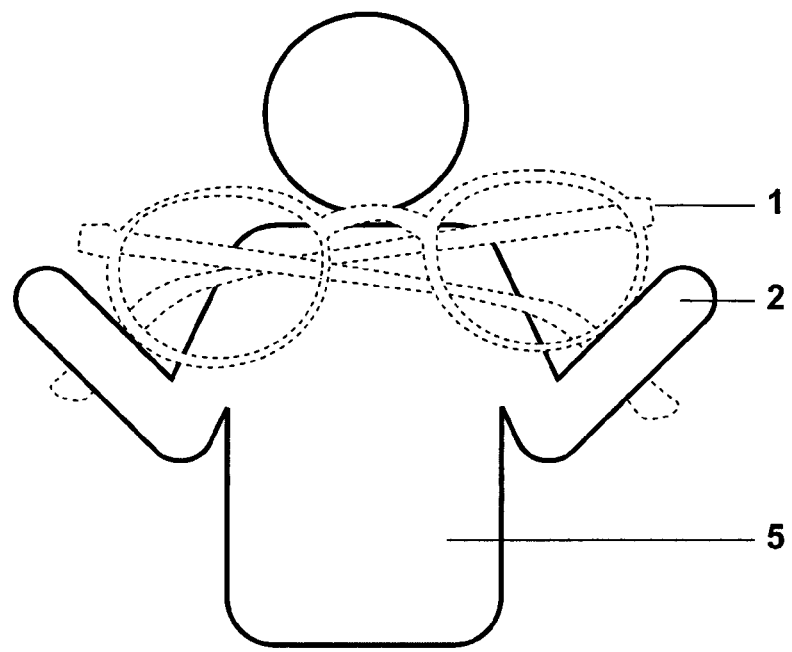
Figure 4:
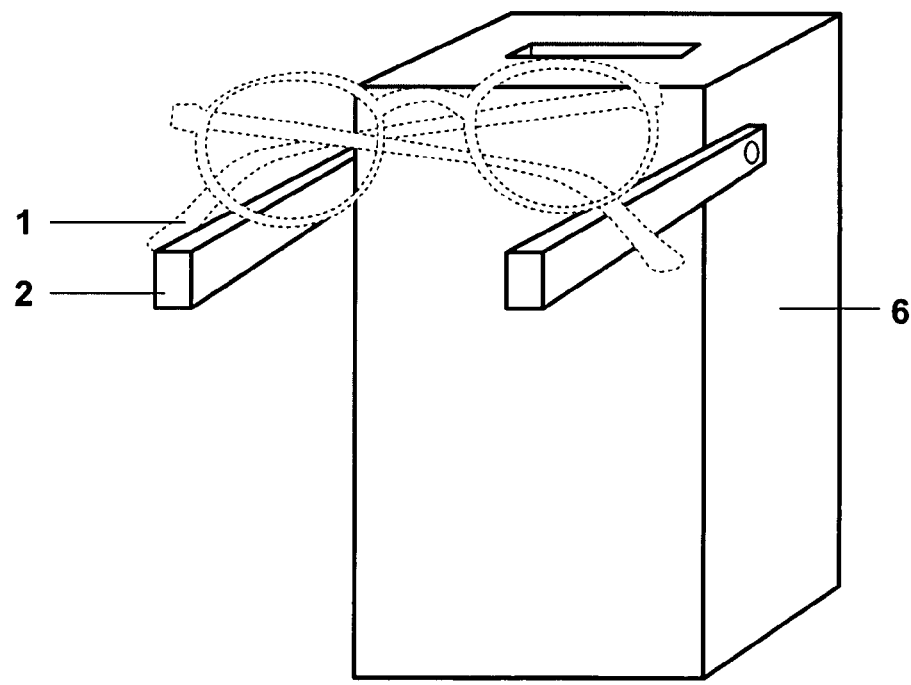
FIG. 4 shows an embodiment where the appendages (2) are connected to a coin bank (6), as exemplary of a children's toy used as a base or frame for the holder. Such options can be easily be configured to accommodate clips and elements to hold the various parts of the frame of the eyeglasses (1), whether folded or not folded.
Figure 5:
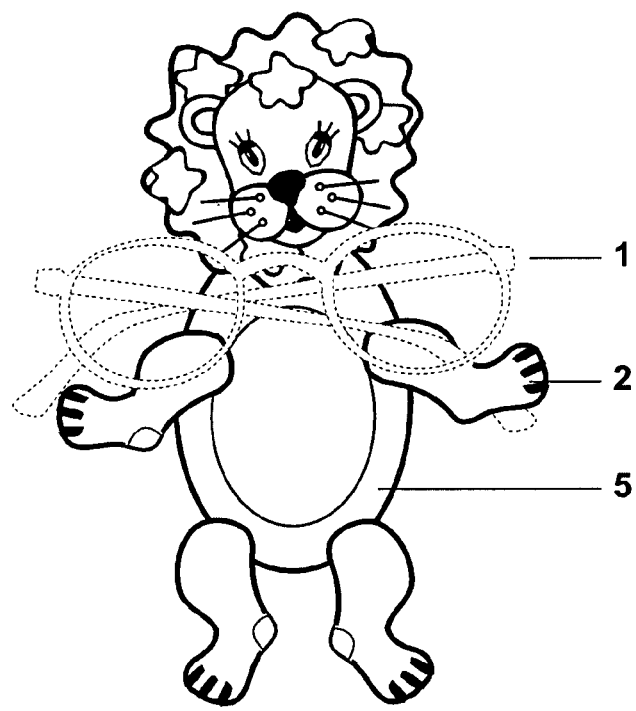
Figure 6:
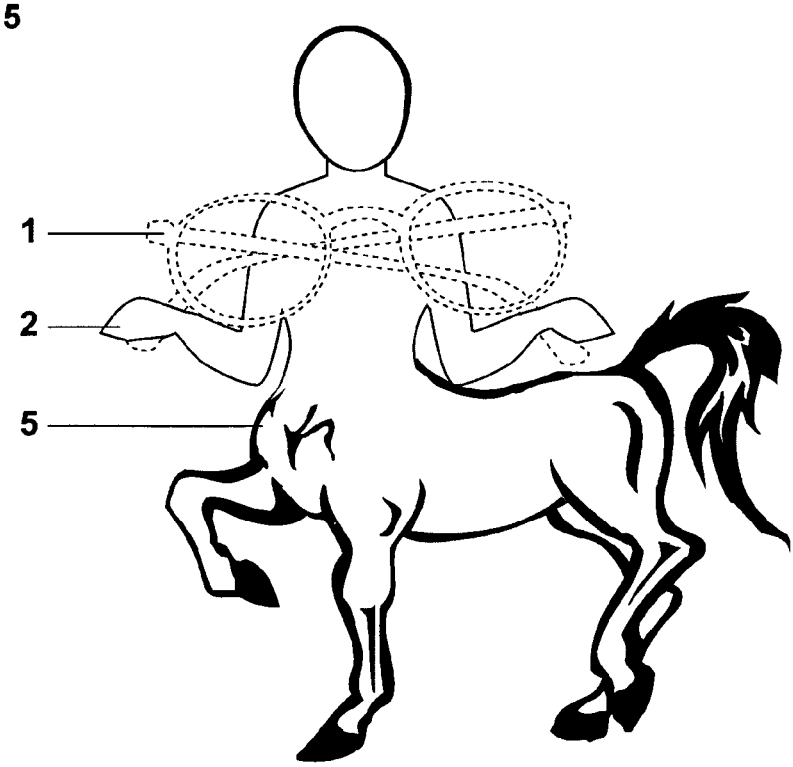

The invention and optional designs have been described above. Referring now to the drawings in particular, FIG. 1 shows in general the invention employing a human-type figure or body. The type of stand used is not particularly important, although the stand should be sturdy enough to hold the figure and the eyeglasses, and sturdy enough to withstand handling of the eyeglasses in the figure and the movement of the figure.

The body can have an exterior layer of soft, pliable material. In one example, the exterior layer is a fabric. A resilient filler material or stuffing is encased within the exterior layer. In one example, the stuffing can be packed with loose fibers or strands of material, such as polyester or cotton wadding or padding. The exterior layer and stuffing, in combination, provide a soft or plush feel. However, the stuffing within the exterior layer of the body, legs, and arms, or appendages, is packed densely enough to generally retain the three dimensional shapes of the figure or animal. A skeleton structure is embedded within the stuffing and within the parts of the body, arms, and legs, or appendages. The skeleton structure can take on various forms and configurations from that disclosed herein and yet fall within the scope of the invention. In one example, the skeleton structure has a primary segment and a pair of arm segments. The primary segment is arranged to follow the contour of the body from a base or leg position in the bottom region, through the body and head region. The ends of the primary segment terminate in a feet section or a base section. Each arm or appendage segment that is designed to hold the eyeglasses has a proximal end coupled to the primary segment, either rigidly connected or through a tie, loop, or knot at a corresponding arm or appendage position within the body. The distal ends of the arm or appendage segments terminate near each hand or equivalent, and the arm or appendage segment can be stably fixed in a horizontal or near horizontal position so that eyeglass can be placed on the arms or appendages.

In another example, the skeleton structure is comprised of a bendable wire comprising a metal or combination of metals and/or a flexible plastic or plastic coating. The wire or plastic can be bent and can retain a selected position. As shown in the figures, the arms can be positioned at a selected position to receive the eyeglasses and the arms retained by the skeleton structure. Though not shown, the body can also be reconfigured to change the body shape. A plastic coating can protect the wire from corrosion and prevents injury to those using the doll, and/or prevents damage to the eyeglasses.

Figure 7:
FIGS. 7 and 8 show a doll positioned with arms extended to accommodate the eyeglasses. The doll can be decorated with clothing, wings, eyeglasses, hair, and a variety of other decorations or attachments. In this case, the doll in composed of a plastic molded figure, with arms the rotate in a tightly fitting connection to the body of the doll. Various other compositions can be used to produce the doll and various moveable and flexible connections for the arms to the body can be selected.
Figure 8:

The style and look of the figure or doll can vary considerably and yet fall within the scope of the present invention. The fabric materials of the body, arms, and legs can be selected, combined, and sewn so the doll is wearing clothing. For example, the dolls in FIGS. 7 and 8 include particular clothing while holding eyeglasses. In addition, the dolls of FIGS. 7 and 8 are fitted with eyeglasses on its face. This option encourages children to use the device and wear their eyeglasses.

The dolls can also be provided in a variety of colors. Additionally, the front side of the body can include various markings or features so as to give the appearance of a facial features, such as a freckles, braces, earrings, and the like. The hands can be fabricated in a variety of hand positions or gestures. The feet can be fabricated to appear to be wearing shoes. As shown in FIG. 1, the lower end can also be fabricated to be a relatively rigid base of plastic or the like to define a platform for resting the figure on a solid surface.

In a particular embodiment, the figure or doll generally comprises in its shoulder joint region, or the equivalent in an animal, an embedded element having a first end and a second end, one of which ends is connected to either of the arm/appendage or the body. In one embodiment, the embedded element is fabricated from any semi-rigid material, such as plastics and the like, and comprises a positioning device that allows rotational movement of the embedded element. A positioning device may take the form of any substantially symmetrical shape, such as a cylinder or a sphere, wherein the axis of revolution is substantially coaxial with the first embedded element. One end of the embedded element comprises a connecting device that is contoured so as to attach without rotation or slippage. The figure, person, doll, character, or animal that comprises the form of the holder can be fixed or is fixed so that element(s) extend horizontally to receive or hold the eyeglasses. Typically and in a preferred embodiment, these elements are appendages or arms of a figure, doll, person, character, or animal, for example. The arms, for example, are either permanently fixed in an outward or horizontal configuration, or can be moved from some other configuration to be temporarily fixed in an outward or horizontal configuration. Mechanisms to temporarily fix the arms or appendages can be devised from many that exist, are known in the art, or can be produced, but include releasable locking gears, moldable plastic, notched rotating hinges or connections, notched ball and socket hinges or connections, flexible doll bodies and/or wire sub-structures, and other moveable or rotating connections. Commercially available doll bodies can be manipulated for this purpose, for example.

In another embodiment, a joint is provided for movably connecting the positioning device and the arm/appendage and body. The joint can form a socket of unitary construction. In the invention, the positioning device includes a device for posably positioning the embedded element at any one of a plurality of preselected positions, at least one of the positions including one that causes the arm or appendage to form a horizontal or near horizontal surface for safely storing eyeglasses.

Those skilled in the art of molding will recognize that the resistance can be varied by choice of material and shape of the internal elements. Thus, by including the devices for posably positioning the figures or dolls, as described above, the arms or appendages can be moved to a variety of discrete positions, wherein one position is horizontal or nearly horizontal so that eyeglasses can be safely held in them.

In operation, the ends of the embedded elements are connected by suitable means to respective proximal and distal pieces, such as the limbs of a figure forming the shoulder joint. Alternatively, the positioning devices could be formed so as to be integral with each end of an appendage (such as an arm, leg, etc.), so that when a joint is formed, appendages will be connected together using a single process step. When it is desired to pose the figure or doll, the limbs can be manipulated so that the shoulder joint is movable to virtually every position. However, the arms can be locked or fixed in a position for holding eyeglasses, and the locking or fixing mechanism can include a visible indicator, such as a shift in the arms location. Alternatively, the arms can include a mechanism that lock once the arms are moved into the eyeglass position and can only be unlocked by a manual button or device.

Figure 9:
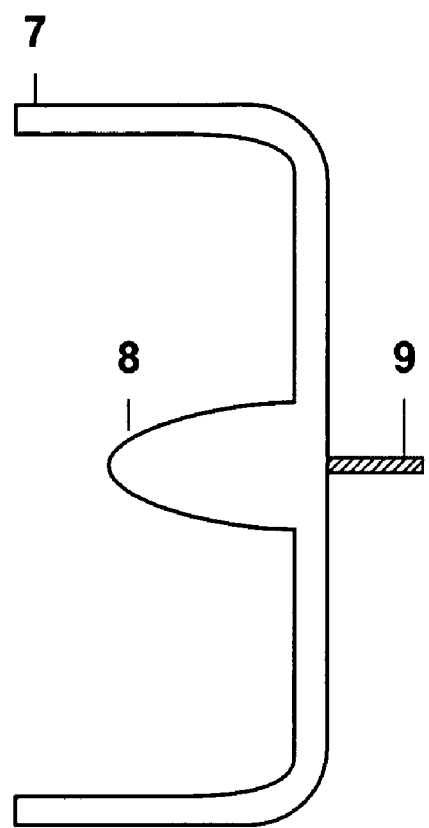
FIGS. 9 and 10 depict an optional holding device of the invention, which can be incorporated into a doll or figure, or attached to an existing doll or figure, frame, stand, or other vertical member or structure, for holding eyeglasses. A variety of vertical structures can be used, including a vertical surface of a device, toy, or object, and even including a wall. The notch or element (10) is designed to accommodate the lens part of the frame and/or is present on both arms (7) or parts of the holding device. Element (8) represents a shaped element or convex-type structure designed to accommodate the bridge part of the eyeglass frame. Connecting part (9), here shown as a screw, represents a device for connecting the holding device to an existing doll or figure structure or vertical structure or supporting structure. To connect the holding device to a vertical structure or surface, one of skill in the art is familiar with many anchoring devices, bolts, screws, adhesives, and other fastening mechanisms and products. Obviously, the elements in FIGS. 9 and 10 are merely representative of the arrangement, spacing, and placement of the three elements in the holding device.
Figure 10:
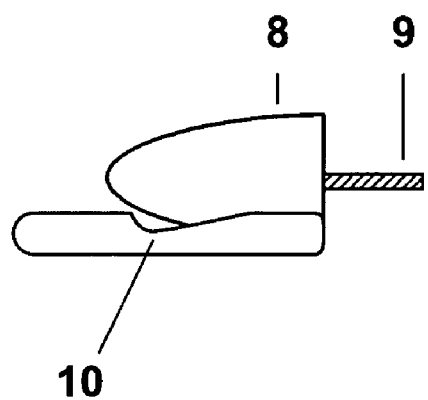

In another embodiment, the person, doll, figure, character, or animal can be fitted with a holding device to produce an eyeglass holder of the invention. Such holding devices are shown in FIGS. 9 and 10. The arrangement of the elements in FIGS. 9 and 10 are optional, that is, the part of the holding device that receives or accommodates the lens part of the frame can be configured or positioned differently than shown. Similarly, the parts of the holding device that receives or accommodates the bridge and/or the part of the frame that extends to the ears can also be configured or positioned differently than shown. Thus, one or more of the elements (1), (2) or (3), for example, can be in different horizontal and vertical positions compared to what is shown in FIG. 10. In essence, the holding device provides a secure resting place for eyeglasses that can be attached, either permanently or securely, to the structure of a toy, doll, figure, or other standing structure, including a wall or other vertical surface.

It will be noted that the present invention is not limited to human figures, but that the joint may be applied with equal efficacy to animal figures, fanciful figures, cartoon or fictional characters, robots, and the like.

There is no intention to limit the invention to the disclosed exemplary forms. Many variations, modifications and alternative constructions fall within the scope and spirit of the disclosed invention as expressed in the claims.

The invention claimed is:

1. A doll figure comprising:
   (a) arms or appendages attached to a body or torso, wherein the arms or appendages form a horizontal position relative to the ground, and wherein the arms or appendages together with the body or torso are sized to accommodate a pair of a persons or childs eyeglasses so that the eyeglasses contact each of the arms or appendages and the arms or appendages together with the body or torso form a holding device for receiving the pair of eyeglasses; and
   (b) a support structure for holding the doll figure in an upright position, wherein the doll figure is capable of securely holding a pair of eyeglasses.

2. The doll figure of claim 1, wherein the doll figure is fashioned to display a human form.

3. The doll figure of claim 2, wherein the body of the doll figure comprises an element for contacting the bridge part of the eyeglasses.

4. A figure comprising:
   (a) moveable arms or appendages, wherein the arms or appendages can be temporarily fixed in a horizontal position;
   (b) a holding device for receiving a pair of a persons or a childs eyeglasses, wherein the eyeglasses contact the device at least at the part of the eyeglass frame around or near the lens, and wherein the moveable arms or appendages together with a body or torso of the figure are sized to accommodate a pair of eyeglasses so that the eyeglasses contact each of the arms or appendages;
   (c) a support structure for holding the figure in an upright position.

5. The figure of claim 4, wherein the figure is fashioned to display a human form.

6. The figure of claim 4, wherein the body of the figure comprises an element for contacting the bridge part of the eyeglasses.

* * * * *